July 13, 1965  J. C. HARIED  3,194,308
CROSS FLOW HEAT EXCHANGER WITH DUCTS IN PANEL
Filed May 28, 1962
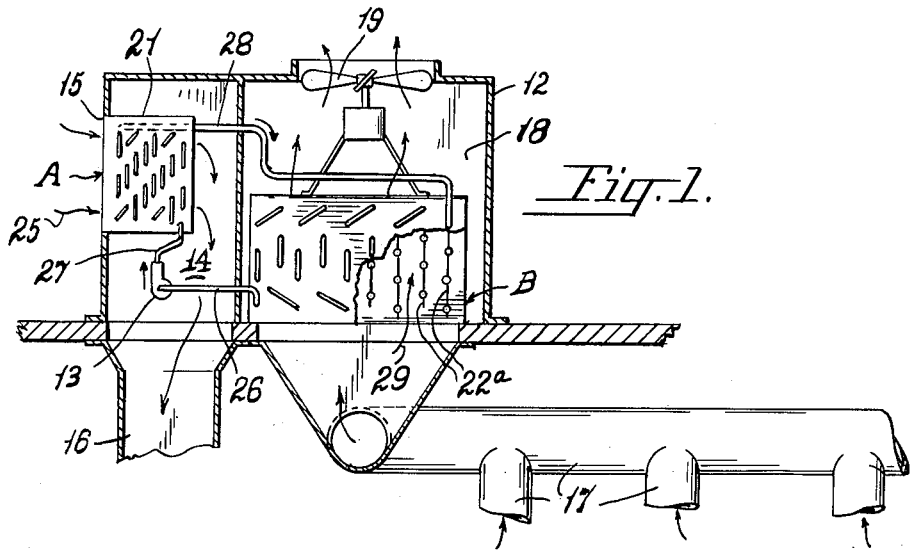
Fig. 1.
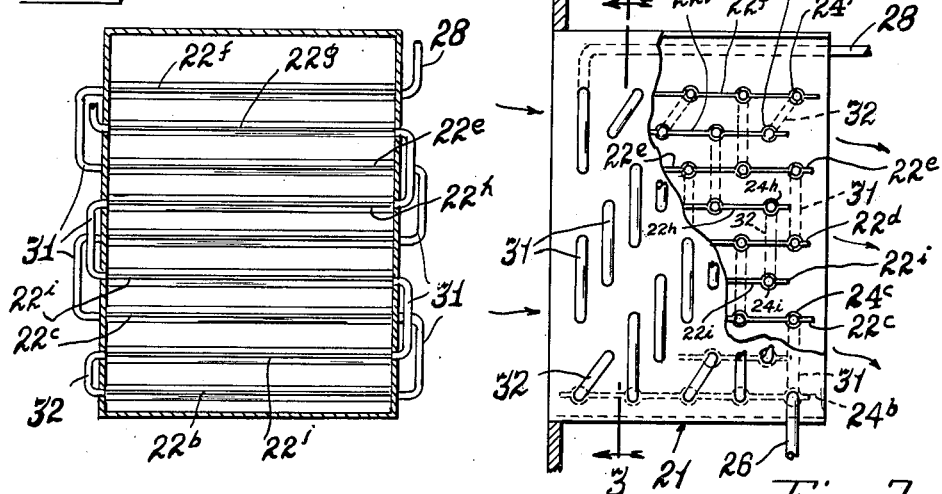
Fig. 3.
Fig. 2.
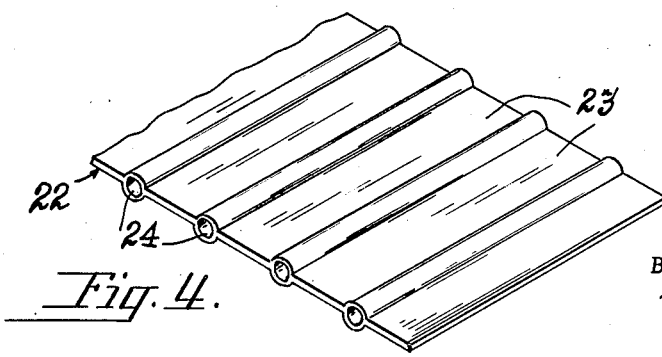
Fig. 4.
INVENTOR.
John C. Haried
BY
Attorney.

12,194,308
CROSS FLOW HEAT EXCHANGER WITH
DUCTS IN PANEL
John C. Haried, 1616 Kenilworth Place, Aurora, Ill.
Filed May 28, 1962, Ser. No. 198,203
3 Claims. (Cl. 165—165)

The present invention relates to improvements in heat exchange equipment and is more particularly concerned with the novel construction and assembly of a waste heat saver and the novel arrangement of heat transfer units therein.

Although the herein disclosed novel arrangement of heat transfer elements is applicable to many various types of installations and in various types of heat exchange equipment, applicant has disclosed same installed in a novel structure particularly designed for pre-heating intake air for laundry drying equipment through the transfer of the heat removed from exhaust air from said drying equipment to the make-up air admitted to said equipment. It is therefore one of the advantages of the herein disclosed structure to remove heat from air discharged from a dryer and to utilize said heat to pre-heat incoming air and thereby reduce the costs of operation.

Heretofore, known types of heat exchange equipment have used coils of tubing, radiators and, more recently, helical coils of heat conductive sheet material having pre-formed fluid passageways therein such as for example, sheet-tubing of a kind sold commercially and known as "Tube-in-Strip" manufactured by Revere Copper and Brass, Incorporated, and hereinafter referred to as tubular-sheet material. The advantages in using such tubular-sheet material are many. To name a few, particularly as applied to laundry drying equipment, such material minimizes the posibility of the air passageway becoming clogged by lint, dirt, grease or other foreign particles of a kind that are entrained in the air stream and withdrawn from drying apparatus; has greater conductivity and affords a much more simplified structure and assembly and one that will withstand greater abuse than a coil of conventional form.

However, applicant has found that the use of such tubular-sheet material in the form of a helical coil is not efficient particularly in a counter-flow heat exchange system of the kind herein disclosed. This is primarily because the heat to be transferred is not collected at the air intake end of such helical coils, but instead is distributed rather uniformly throughout the length thereof. As a result, there is an inefficient transfer of heat, with the larger proportion thereof being retained in the original carrier stream and returned to its source.

It is proposed herein to arrange the tubular-sheet material in heat exchange equipment in a manner to impart maximum operating efficiency and it is, therefore, one of the objects of the invention to do so.

Another object of the invention is to provide novel equipment for removing heat from air exhausted therethrough and transferring it to make-up air entering said equipment.

Another object is to provide novel equipment for pre-heating make up air entering drying apparatus by the transfer of heat thereto from hot air exhausted from said apparatus.

Another object is to provide equipment of the character herein disclosed which is not expensive or difficult to manufacture, is highly efficient in use, inexpensive to operate, and which requires practically no servicing.

The structure by means of which the above noted and other features and advantages of the invention are attained will be described in the following specification, taken in conjunction with the accompanying drawing, showing a preferred illustrative embodiment of the invention, in which:

FIG. 1 is a schematic view of representative heat exchange equipment of a character useful in dry cleaning establishments;

FIG. 2 is an enlarged elevational view of the heat transfer unit A, showing it partly broken away;

FIG. 3 is a fragmentary sectional view taken substantially on line 3—3 of FIG. 2; and FIG. 4 is a fragmentary perspective view of the tubular-sheet material used in the heat transfer units A and B.

Referring to the exemplary disclosure in the accompanying drawings and particularly to FIG. 1, the heat exchange equipment illustrated is of a character primarily intended to effect transfer of heat extracted from exhaust air from the drying apparatus of a dry cleaning establishment into the make-up air delivered to said apparatus. It will become apparent from the disclosure herein that the heat exchange equipment per se and the heat exchange units therein are suitable for installation and use in any heat exchange system wherein different streams of air are flowed over heat exchange units in such manner as to reduce the temperature of one stream and increase the temperature of the other stream. In the present disclosure, the transfer of heat from the hot exhaust air stream leaving a drying apparatus into the make-up air stream flowing thereto greatly reduces the operational costs of the laundry equipment because the pre-heated make-up air reduces the heating requirements of the heat source equipment of the dryer.

More particularly, the heat exchanger equipment comprises a housing 12 within which is arranged a pair of similar and novel construction heat transfer units A and B, which are interconnected one with the other and in series with a pump 13 operable to cause a heat transfer medium, such as water including an anti-freeze, to be circulated through and between the units.

The unit A is arranged in a housing compartment 14 so as to receive outside make-up air through opening 15. The air flows over and around the heat transfer components of unit A and is delivered, as by a duct 16, to the air intake side of drying apparatus (not shown) in a dry cleaning establishment. The hot exhaust air from the drying apparatus may be withdrawn through one or more ducts 17 and is delivered into a housing compartment 18, after passing through the heat transfer unit B, and is discharged to the atmosphere by a blower 19.

In the exemplary disclosure, heat from the hot exhaust air withdrawn from the drying apparatus is transferred to the fluid in unit B. The heated fluid in unit B is circulated through unit A, upon operation of pump 13, and the heat from said fluid is transferred to incoming or make-up air entering opening 15, so as to pre-heat same and thus minimize the amount of applied heat normally required in the drying apparatus to overcome the normal low temperature of incoming make-up air.

Maximum efficiency is obtained by use of units A and B when the heat transfer elements therein are fabricated from tubular-sheet material of the character referred to hereinabove. This material comprises a thin sheet of heat absorbent material, such as aluminum, copper, etc., having mutually spaced pre-formed passageways therein for the flow of a heat transfer medium therethrough. As noted hereinabove, tubular-sheet material has been utilized heretofore as a heat transfer medium in air handling equipment but in such manner as to be extremely inefficient and wholly unsuited for the purpose intended. One known use has been to coil a length of such tubular sheet material helically and wherein the heat transfer medium is flowed simultaneously into common ends of all of the passageways thereof. Because of this manner of flow, a large percentage of the heat transfer medium is not subjected to nor is it effected by much of the air flowing thereover. Otherwise, stated, air flowing between the helixes at the outer periphery of the helical coil, where the heat transfer medium is entering the coil, is subjected to a maximum amount of heat transfer whereas as the axial center is approached the temperature differential between the air flow and the heat transfer medium is minimal.

In the present disclosure, applicant has provided novel heat exchange equipment that operates at maximum efficiency to remove heat from hot exhaust air flowing therethrough and transfer said heat to cooler make-up air entering the equipment. As best shown in FIGS. 2 and 3, the unit A is comprised of a casing 21 open at its ends to provide a passageway for make-up air entering compartment 14. The heat transfer elements 22 (FIG. 4) comprise a plurality of sheets of tubular-sheet material of the character described hereinabove each consisting of a thin web 23 having mutually spaced fluid flow passageways 24 extending from edge to edge. These elements 22 bridge the space between the side walls of casing 21 and are spaced apart, in the FIGS. 2–3 disclosure, one above the other in horizontal planes with passageways 24 extending transversely of shell 21 so that air flowing from one end of said casing to the other, as indicated by flow arrows 25 in FIG. 1, will pass between and have maximum contact with said elements 22 to insure maximum heat transfer between the air stream and the elements and fluid that is flowed through passageways 24.

As shown, heat absorbent fluid, in this instance water including an anti-freeze, is delivered to unit A through conduit 26, pump 13 and conduit 27 from unit B and is returned to unit B through a conduit 28. Both units A and B are substantially alike with the principal difference being in the planular disposition of the tubular-sheet material elements 22. As shown in FIG. 1, the tubular-sheet material elements 22a in unit B are disposed in vertical planes so as to permit passage of air stream in a vertical direction, as indicated by the flow arrows 29.

Referring again to the detail disclosure in FIGS. 2 and 3, the heat transfer fluid is delivered to unit A through conduit 27 at the air outlet end of the unit. The fluid flows through a first passageway 24b in the lowermost strip 22b and is conveyed by an external end connection 31 to a first passageway 24c in a third strip 22c, from where it is conveyed to successive first passageways in the remaining strips 22d, 22e, 22f, which with the aforesaid strips 22b and 22c are hereinafter termed alternate strips, through successive external end connections 31, it being noted that all said first passageways are contained in a plane which is disposed substantially perpendicular to the path of the air stream moving through the unit. In this manner all of the incoming heat transfer medium is carried into the path of the outgoing air stream at the region of the exit end of unit A, hence maximum heat transfer occurs in this region.

Fluid flowing through the first passageway 24f in the uppermost strip 22f is delivered through an end connection 32 to passageway 24g of strip 22g, arranged intermediate the aforesaid strips 22e and 22f. End connections 32 connect successive passageways 24h, 24i, etc., in the lower level intermediate strips 22h, 22i, etc., in series for making up the complete unit. Successive series of passageways in said strips extending in a direction toward the air inlet end of said unit A are connected in series one to the other by end connections 31, 32, as shown, in substantially the same manner as described hereinabove so that the rate of heat transfer progressively diminishes as the air entry end of the unit A is approached.

In like manner maximum heat exchange in unit B occurs at the lower or air entry end thereof.

It should be evident at this time that applicant has provided a heat transfer unit that operates to provide maximum temperature differences at the make-up air inlet end thereof and one wherein there is minimum interference to the flow of air therethrough and with few or no surfaces upon which dirt, lint, and other foreign particles may collect in excessive amounts.

It is believed that the invention, its mode of construction and assembly, and many of its advantages should be readily understood from the foregoing without further description, and it should be manifest also that while a preferred embodiment of the invention has been shown and described for illustrative purposes, the structural details are nevertheless capable of wide variation within the purview of the invention as defined in the appended claims.

What I claim and desire to secure by Letters Patent of the United States is:

1. A heat transfer unit comprising a casing defined by spaced-apart top and bottom walls and spaced-apart side walls and having oppositely disposed air inlet and air discharge ends, a plurality of sheets of heat transfer material extending between the casing side walls and spaced from one another throughout their full extent and lying in planes which are substantially parallel to one another, thereby to subdivide the air flow path through the casing into a plurality of lesser parallel paths, means forming a plurality of fluid-flow passageways in each sheet and which are disposed normal to the path of air flow through the casing and have length as to extend between the casing side walls, means disposed externally of the side walls and connecting those passageways of alternate sheets which are contained in planes substantially perpendicular to the air flow path in series with one another and thence in series with the correspondingly disposed passageways of an intermediate sheet and in such manner as to form a continuous fluid-flow passageway which extends progressively through all of said sheets and in a direction opposed to the direction of air flow through said plurality of air flow passages, a fluid inlet connected to that sheet passageway at the air discharge end of the casing which constitutes the beginning of the continuous fluid-flow passageway, and a fluid outlet connected to that sheet passageway at the air inlet side of the casing which constitutes the end of the continuous fluid-flow passageway.

2. A heat transfer unit as recited in claim 1, in which the means externally of the side walls comprises tubular conduits.

3. A heat transfer unit comprising a casing defined by spaced-apart top and bottom walls and spaced-apart side walls and having oppositely disposed fluid inlet and fluid discharge ends, a plurality of sheets of heat transfer material extending between the casing side walls and spaced from one another throughout their full extent and lying in planes which are substantially parallel to one another, thereby to subdivide the fluid-flow path through the casing into a plurality of lesser parallel paths, means forming a plurality of fluid-flow passageways in each said sheet and which are disposed normal to the path of fluid flow through the casing and have length as to extend between the casing side walls, end connections disposed externally of the side walls and connecting those passageways of alternate sheets which are contained in planes substantially perpendicular to the fluid flow path through the casing in series with one another and thence in series with the correspondingly disposed passageways of an intermediate sheet and in such manner as to form a continuous fluid-flow passageway which extends progressively through all of said sheets and in a direction opposed to the direction of fluid flow through said plurality of fluid-flow passages in the casing, a fluid inlet connected to that sheet passageway at the fluid discharge end of the casing which constitutes the beginning of the continuous fluid-flow passageway, and a fluid outlet connected to that sheet passageway at the fluid inlet side of the casing which constitutes the end of the continuous fluid-flow passageway.

References Cited by the Examiner

UNITED STATES PATENTS

| | | | |
|---|---|---|---|
| 1,751,317 | 3/30 | Gail | 165—144 |
| 2,286,271 | 6/42 | Higham | 29—157.3 |
| 2,375,702 | 5/45 | Smith | 165—145 |
| 2,509,011 | 5/50 | Moore | 164—171 |
| 2,691,279 | 10/54 | Anderson | 165—132 |
| 2,926,003 | 2/60 | Pulsifer | 164—170 |
| 2,995,807 | 8/61 | Gibbs | 165—170 |
| 2,999,308 | 9/61 | Pauls | 165—164 |
| 3,077,031 | 2/63 | Fromson | 29—157.3 |

FOREIGN PATENTS

| | | |
|---|---|---|
| 460,374 | 5/28 | Germany. |
| 247,529 | 11/47 | Switzerland. |
| 310,329 | 12/55 | Switzerland. |

CHARLES SUKALO, *Primary Examiner.*